United States Patent [19]

Puppe et al.

[11] Patent Number: 4,913,850

[45] Date of Patent: Apr. 3, 1990

[54] PROCESS FOR THE REMOVAL OF IODINE AND ORGANIC IODINE COMPOUNDS FROM GASES AND VAPORS USING SILVER-CONTAINING ZEOLITE OF THE FAUJASITE TYPE

[75] Inventors: Lothar Puppe, Burscheid; Jürgen Wilhelm, Gondelsheim/Baden, both of Fed. Rep. of Germany

[73] Assignee: Bayer Aktiengesellschaft, Leverkusen, Fed. Rep. of Germany

[21] Appl. No.: 318,841

[22] Filed: Mar. 6, 1989

[30] Foreign Application Priority Data

Mar. 16, 1988 [DE] Fed. Rep. of Germany ....... 3808742

[51] Int. Cl.$^4$ .................. G21F 9/02; G21C 19/42; B01J 29/08; C01B 7/00

[52] U.S. Cl. ...................................... 252/630; 55/71; 55/75; 210/679; 210/682; 210/684; 376/313; 376/314; 423/240; 423/241; 502/79

[58] Field of Search ............ 252/630; 55/66, 71, 55/74, 75, 76, 98; 210/679, 682, 684; 376/313, 314; 423/239, 240, 241; 502/79

[56] References Cited

U.S. PATENT DOCUMENTS

| | | | |
|---|---|---|---|
| 4,088,737 | 5/1978 | Thomas et al. | 252/630 |
| 4,204,980 | 5/1980 | Pasha et al. | 252/630 |
| 4,234,456 | 11/1980 | Kamiya et al. | 252/630 |
| 4,275,045 | 6/1981 | Anav et al. | 423/249 |
| 4,447,353 | 5/1984 | Pence et al. | 252/630 |
| 4,454,062 | 6/1984 | Penzhorn et al. | 252/630 |
| 4,518,562 | 5/1985 | Deitz | 376/313 |
| 4,659,477 | 4/1987 | Macedo et al. | 210/682 |
| 4,663,113 | 5/1987 | Jester et al. | 376/256 |
| 4,695,561 | 9/1987 | Deitz | 376/313 |

OTHER PUBLICATIONS

Kirk–Othmer, "Concise Encyclopedia of Chemical Technology", John Wiley & Sons, Inc., p. 772 (1985).

D. W. Breck, Zeolite Molecular Sieves, John Wiley & Sons, Inc., New York, 1974.

D. T. Pence, F. A. Duce, W. J. Maeck, Proceedings 12th AEC, Air Cleaning Conference, Oak Ridge, TN, 1973, p. 417.

J. G. Wilhelm: "Trapping of Fission Product Iodine with Silver Impregnated Molecular Sieves"; 1969.

*Primary Examiner*—Howard J. Locker
*Attorney, Agent, or Firm*—Connolly and Hutz

[57] ABSTRACT

Iodine and organic iodine compounds which may be radioactive and which may be found in waste gases or vapors from nuclear reactors can be removed from such gases or vapors by passing the iodine or organic iodine compound-containing gases or vapors through a layer of binder-free silver-exchanged molecular sieve granulates of the faujasite type.

8 Claims, No Drawings

PROCESS FOR THE REMOVAL OF IODINE AND ORGANIC IODINE COMPOUNDS FROM GASES AND VAPORS USING SILVER-CONTAINING ZEOLITE OF THE FAUJASITE TYPE

This invention relates to a process for the rapid and substantially complete removal of iodine and/or organic iodine compounds containing a small number of carbon atoms from gases and/or vapors using silver-exchanged zeolite X.

BACKGROUND OF THE INVENTION

It is known that active carbon alone or impregnated with iodine and/or iodide can be used for the removal of organic iodine compounds and/or iodine from gases and more especially for the separation of radioactive fission product iodine from atmospheres in nuclear plants [R. E. Adams, R. D. Ackley; Chapter 2.1: "Trapping of Radioactive Iodine and Methyliodide by Iodized Charcoal" in Nuclear Safety Program Annual Progress Report for Period Ending Dec. 31, 1967 ORNL-4228 (April, 1968, pp. 99 to 114)]. Amine-impregnated active carbons are also used.

However, this adsorption material cannot be used universally because it is flammable and releases the adsorbed iodine again in significant quantities at relatively low temperatures, for example 150° C. If relatively high temperatures occur in the gas to be cleaned or if the adsorber material is likely to be strongly heated by the heat of decay of radioactive fission products, temperature-resistant and non-flammable materials must be used.

It has been found that fission product iodine occurs in waste gases of nuclear plants not only in elemental form, but also in the form of organic compounds containing a small number of carbon atoms, for example in the form of radioactive methyl iodide. For this reason, adsorber materials, which are supposed to be generally useable, also have to retain organic iodine compounds in equal measure.

Other adsorber materials which may be used for the separation of iodine, possibly under precisely defined adsorption conditions, such as for example silver-impregnated ceramic sintered products (so-called Berl saddles), silver-coated copper chips or silver-coated silica gel, are either insufficiently effective or totally ineffective for retaining methyl iodide or lose their effectiveness when superheated steam is passed through. In addition, impregnated silica gel has the property of taking up water and thus losing its strength. Accordingly, these materials are unsuitable for general application, i.e. for use in various iodine removal plants under possibly different or even rapidly changing adsorption conditions, for example during or after an accident.

Although the shaped silver-impregnated sorbent particles described in DE-OS 21 09 146, which consist predominantly of amorphous silica, are capable of effectively sorbing iodine and iodine compounds and are unaffected by superheated steam, they have the disadvantage that the salt impregnation can be washed out under the superheated steam conditions at 150° C.

By contrast, silver-exchanged molecular sieve zeolites are resistant to washing out. Zeolites are alumosilicate structures having the following general formula $$M_{m/z}[mAlO_2 \cdot n\ SiO_2] \cdot q\ H_2O$$

in which $M_{m/z}$ are exchangeable cations, $[mAlO_2 \cdot nSiO_2]$ is the anionic framework and $q\ H_2O$ is the sorbed phase. Corresponding zeolites are described, for example, in D. W. Breck, Zeolite Molecular Sieves, John Wiley & Sons, Inc., New York, 1974.

Silver-exchanged molecular sieves have already been investigated for the sorption of iodine [D. T. Pence, F. A. Duce, W. J. Maeck, Proceedings 12th AEC, Air Cleaning Conference, Oak Ridge, Tenn., January 1973, p. 417; J. G. Wilhelm: "Trapping of Fission Product Iodine with Silver Impregnated Molecular Sieves", presented at the International Congress of the Diffusion of Fission Products, Saclay, France, Nov. 4th to 6th, 1969; Report of the Gesellschaft fur Kernforschung mbH, Karlsruhe, No. KFK-1065 (October 1969)]. Suitable molecular sieves are sodium alumosilicates, for example having a composition represented by the following summation formula $$Na_{86}[AlO_2)_{86}\ (SiO2)_{106}] \cdot x\ H_2O$$

with the structure of faujasite.

In the treatment with silver nitrate, the sodium ions are exchanged for silver ions. High degrees of separation are achieved for methyl iodide and elemental iodine at high relative air humidities. According to the prior art, clay-bound silver-exchanged zeolite granulates are used for the adsorption of iodine. Degrees of separation of 99.9% can be achieved in this way. In order to reduce the high cost of the iodine sorption filters, it is desirable to achieve higher degrees of separation.

BRIEF DESCRIPTION OF THE INVENTION

The object of the present invention is to provide a process which avoids the disadvantages of processes using known adsorber materials and which guarantees the rapid, substantially complete removal of iodine and/or organic iodine compounds containing a small number of carbon atoms from gases and/or vapors in nuclear plants under different, rapidly changing and possibly extreme operating conditions during or after an accident.

According to this invention, this object is achieved in that the gases or vapors containing iodine and/or iodine compounds are passed through a layer of a silver-exchanged, binder-free molecular sieve of faujasite structure, advantageously through a bed of loosely packed, shaped sorbent particles (granules, such as beads, rodlets, grains, chips). In another advantageous embodiment of the invention, the gases and vapors are passed through shaped porous bodies formed of shaped sorbent particles, more especially beads, for example through porous plates, porous cylinders or porous hollow bodies.

DETAILED DESCRIPTION

Iodine and organic iodine compounds, especially those which are radioactive and found in waste gases or vapors from nuclear reactors, can be substantially completely and rapidly removed from vapors or gases by passing the vapors or gases containing iodine or organic iodine compounds through a silver-exchanged solvent which is binder-free silver-exchanged molecular sieve granulates of the faujasite type.

The silver-exchanged sorbents used to carry out the process according to the invention consist of particles in bead form or in the form of granules, such as rodlets, grains or chips a few millimeters in diameter or length which comprise 80 to 90% zeolite X and 10 to 20% zeolite A.

The granulates have a high mean mechanical strength of $\geq 60$ N for a diameter of 2 to 4 mm. After exposure for 100 hours to a saturated steam atmosphere at 160° C., the granulates show no reduction in mechanical strength.

In addition, the granulate used in accordance with the invention is unaffected by steam in regard to its adsorption capacity. In the test described above, there was no reduction in water adsorption.

A suitable starting material for the production of the sorbent granulates in the binder-free molecular sieve granulate of faujasite structure produced in the form of a beadform granulate by the processes described in DE-OS No. 34 01 485 and DE-AS 12 03 238.

The ion exchange with silver salt solutions is carried out in accordance with the prior art. In the silver exchange process, the exchange equilibrium lies on the zeolite side, so that the exchange process may also be carried out with advantage at room temperature. In addition, the quantity of silver required can be introduced in a single exchange. An advantage over the prior art is that the degree of exchange of the zeolites used in accordance with the invention can be considerably lower, amounting to between 20 and 35% by weight Ag, based on the binder-free granules, and preferably to between 25 and 30% by weight compared with the value of more than 40% of the prior art cited above.

EXAMPLE 1

30 kg sodium zeolite X having a water content of 25% (ignition loss) and 15 l 30% silica sol (BET surface approx. 300 m$^2$/g) are processed in an intensive mixer to a granulate having a grain size of from about 0.1 to 0.7 mm. This "pre-granulate" was introduced into a granulation pan.

Finely powdered zeolite X was then continuously introduced in a measured quantity into the rotating pan while, at the same time, the 30% silica sol was sprayed onto the moving granulate elsewhere in the pan. A stream of waterglass was mixed with the silica sol through an injector so that a ratio of sol to waterglass of 9:1 was established. A bead-form granulate 2 to 4 mm in diameter was obtained.

5 kg of the above silica-gel bonded faujasite granulate containing 35% by weight water, based on anhydrous granulate 2 to 4 mm in diameter, were introduced into a rubberized container fitted with sieve trays. An aqueous-alkaline sodium aluminate solution was pump-circulated through the granulate layer. To prepare this aluminate solution, 2.4 kg alumina hydrate (containing 65% $Al_2O_3$) were dissolved in 4.5 l 45% sodium hydroxide (density 1.48) at the boiling temperature and the clear solution formed subsequently diluted with 33 liters water. The aluminate treatment was carried out first overnight (15 hours) at ambient temperature. The circulating aluminate solution was then heated to 45° C. by a heat exchanger installed in the liquor circuit and circulated for 5 hours. The temperature was then kept at 80° C. for another 3 hours.

The resulting granules of completely crystalline mixed zeolite was washed with water to a pH value of the outflowing washing water of 9 to 10 and were then dried. According to X-ray analysis, approximately 80 to 95% of the granules consisted of Na faujasite in addition to sodium zeolite A.

EXAMPLE 2

1285 g of the granulate described in Example 1, but not yet activated, are introduced into a darkened column into which 3000 ml of a silver nitrate salt solution containing 573 g $AgNO_3$ are then introduced. The salt solution is then pump-circulated for 8 hours. At the end of the exchange process, no more silver can be detected in the exchange solution.

The granulate is washed with deionized water, dried at 110° C. and then activated in a stream of hot air at 450° C. According to X-ray analysis, approximately 75 to 80% of the granules consisted of Ag faujasite in addition to Ag zeolite A. Their breaking strength measures 70 Newtons.

EXAMPLE 3

The granulate produced in accordance with Examples 1 and 2 was used for the sorption of iodine. $H_2O$ vapor at 105° C. was introduced into a filter bed. $CH_3I$ was then fed into the 160° C. vapor stream, after which more steam was passed through. A degree of separation of 99.99% is obtained for a bed depth of 10 cm.

EXAMPLE 4

Comparison Example

Commercially available silver zeolite granulates corresponding to the prior art were introduced into a filer bed. The test was carried out in the same way as in Example 3. A degree of separation of 99.9% is obtained for a bed depth of 10 cm.

EXAMPLE 5

Long-time test: Adsorption of elementary iodine

The granulates manufactured according to Examples 1 and 2 were used for iodine sorption. In a test filter having a diameter of 2.5 cm, and a layer thickness of zeolite granulate of 5 cm$\times$2.5 cm, a preliminary flow with a hot steam/air mixture (ratio 2.7 : 1) was carried out at a temperature of 145° C. (293° F.) during 23 hours for conditioning purposes. The linear speed was 31 cm/sec. Subsequently, elementary iodine was passed into the feed air flow of the filter for 1 hour and finally, flushing was performed for 24 hours with the hot steamair mixture in order to ascertain any occurring desorption. The mean concentration of iodine in the gas flow was 0.26 mg/m$^3$.

The adsorption efficiency was 99.97% at a thickness of 7.5 cm.

EXAMPLE 6

Short-term test: Adsorption of elementary iodine

The test filter and hot steam air mixture corresponded to Example 5, but the temperature was 140° C. (284° F.). Conditioning was carried out for 0.5 hour, the iodine was fed in for 0.5 hour and the flushing lasted 1.5 hours. The mean concentration of iodine in the gas flow was 1.27 mg/m$^3$.

The adsorption efficiency was 99.961% at a layer thickness of 5 cm and 99.964% at a thickness of 7.5 cm.

EXAMPLE 7

Cold-start test: Adsorption of elementary iodine

In this test, the hot steam-air mixture (55% $H_2O$-steam, 45% air linear speed 25 cm/sec, 146° C. (294° F.)

and the elementary iodine were passed over the cold filter simultaneously. After 3 minutes, the filter reached the dew point temperature of 96° C. (204° F.), after another 8 minutes, the dew point was exceeded, and the final temperature of 146° C. (294° F.) was reached after 60 minutes.

The adsorption efficiency was 99.974% at a layer thickness of 5 cm and 99.984% at a thickness of 7.5 cm.

EXAMPLE 8

Long-time test: Adsorption of $CH_3I$

The test filter with the sorbent material was conditioned with a hot steam-air mixture at 154° C. (309° F.) for 48 hours. The linear speed was 31 cm/sec and the hot steam/air ratio was 2.7:1.

Subsequently, $CH_3I$ was passed into the feed air flow for 7 hours and then flushed with the hot steam-air mixture for 48 hours. The mean concentration of $CH_3I$ was 0.35 mg/m$^3$.

The adsorption efficiency was 98.75% at a layer thickness of 5 cm and 99.83% at a thickness of 7.5 cm.

EXAMPLE 9

Conditioning near the dew point, Adsorption of $CH_3I$

The test filter with the sorbent material was conditioned with a hot steam-air mixture at a temperature between 100° C.–105° C. (212° F.–221° F.) for 19 hours. The gas speed was 31 cm/sec and the hot steam/air ratio was 2.7:1. Subsequently, the temperature was raised to 152° C. (305° F.) within 35 minutes and then loaded with $CH_3I$ for 7 hours. The mean concentration of $CH_3I$ was 0.36 mg/m$^3$.

The adsorption efficiency was 99.38% at a layer thickness of 5 cm and 99.95% at a thickness of 7.5 cm.

What is claimed is:

1. A process for the rapid and substantially complete removal of iodine and organic iodine compounds from gases or vapors, which comprises passing gases or vapors containing iodine, organic iodine compounds or both through binder-free silver-exchanged molecular sieve granulates of the faujasite type.

2. A process according to claim 1 wherein the gases or vapors contain iodine or methyl iodide or both.

3. A process according to claim 1 wherein the gases or vapors are waste products from nuclear reactors.

4. A process according to claim 1 wherein the iodine and organic iodine compounds are radioactive.

5. A process according to claim 1 wherein the gases or vapors are passed through a bed of loosely packed particles of binder-free silver-exchanged molecular sieve granulates of the faujasite type.

6. A process according to claim 5 wherein said particles are in the form of bead, grains or chips.

7. A process according to claim 1 wherein the granulates comprise 80 to 90% zeolite X and 10 to 20% zeolite A silver-exchanged to a silver content of 20 to 35% by weight of silver.

8. A process according to claim 7 wherein the granulate silver content is 25 to 30% by weight.

* * * * *